Oct. 5, 1926.
JEAN-BAPTISTE J. A. VIGNERON
1,601,893
TRAWLING GEAR
Filed March 19, 1925
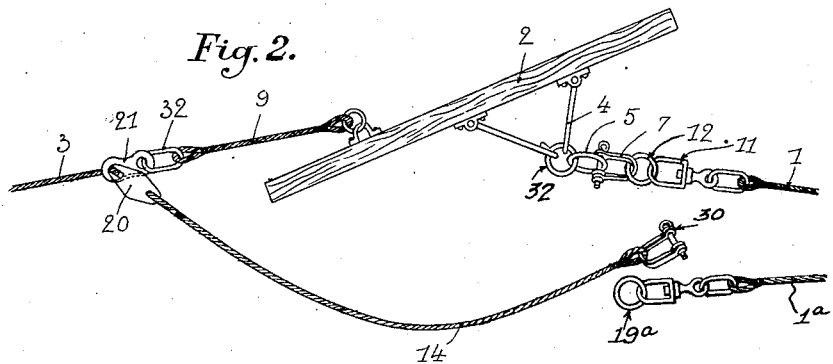
INVENTOR:
Jean-Baptiste Joseph Alphonse Vigneron
BY: Francis E. Boyes
ATTORNEY Patented Oct. 5, 1926.

1,601,893

UNITED STATES PATENT OFFICE.

JEAN-BAPTISTE JOSEPH ALPHONSE VIGNERON, OF LA ROCHELLE, FRANCE, ASSIGNOR TO VIGNERON, DAHL & CIE., OF LA ROCHELLE, FRANCE.

TRAWLING GEAR.

Application filed March 19, 1925, Serial No. 16,614, and in France April 23, 1924.

The present invention relates to improvements in trawling gears according to my prior U. S. Patent No. 1,553,754, filed December 6, 1923.

The object of the present invention consists in providing means for facilitating the operation of bringing the gear aboard by the use of a separate haulage warp adapted to be connected to the pennant.

The invention is more particularly described with reference to the accompanying drawings in which:

Fig. 1 is a diagrammatic plan view showing an otter board and its attachment to the ground rope and haulage warp, a completely detachable pennant, and a separate haulage warp.

Fig. 2 is a diagrammatic plan view of a modification.

Fig. 3 is a side elevation of a slight modification.

In the fishing operation the net is trawled on each side by means of the cable 1 connected to the boat, the panel or otter board 2 and the ground rope 3 connected to one of the net wings.

In the construction shown in Fig. 1, in order to bring the net aboard, a detachable pennant 14 is used, which is provided at its ends with shackle connections 30, 31. In the fishing operation the pennant is loose and connected by the shackle 31 to the link 13, the shackle 30 at its opposite end being connected to the board, for instance to the link 32.

If desired the pennant may be left free at the end carrying the shackle 30. It may also be connected to the links 12 and 13, only when the haulage of the net is to be carried on.

For hauling the net aboard, a separate haulage warp 1ª is used, having a link 12ª to which the shackle 30 may be temporarily connected, said haulage warp 1ª being mounted on a separate winch distinct from the winch of the warp 1.

In bringing the gear aboard, the winch hauls upon the haulage warp 1 until the otter board 2 comes on board and the shackle 30 is then attached to the link 12ª of the separate haulage warp 1ª. After this has been done the shackle 10 uniting the link 13 to the board 2 can then be released, so that the separate haulage warp 1ª, the pennant 14 and ground rope 3 may be coiled upon the separate winch.

The construction shown in Fig. 2 differs from the preceding in that the pennant 14 is connected by a stopper 20 with the cable 3 and the board 2 is provided on its crow foot 9 with an eye 21 adapted to abut against said stopper.

In Fig. 3 the eye 21 is replaced by a link 21ª directly mounted on the branches of the crow foot 9.

With both devices, the haulage of the net proceeds as described above with the difference that it is not necessary to detach the shackle 10 of the first arrangement described, the cable 3 being pulled through the eye 21 or ring 21ª as the haulage of the net is carried on.

Having now described my invention, what I claim as new and desire to secure by Letters Patent is:

In a trawling gear with otter boards, a board, a haulage warp, detachable means for connecting the haulage warp to the board, a ground rope, means for connecting the board to the ground rope, a pennant, means for connecting the pennant to the ground rope, a separate haulage warp and means for detachably connecting said separate haulage warp to the pennant.

In testimony whereof I have signed my name to this specification.

JEAN-BAPTISTE JOSEPH ALPHONSE VIGNERON.